(12) United States Patent
Cho et al.

(10) Patent No.: US 8,254,428 B2
(45) Date of Patent: Aug. 28, 2012

(54) APPARATUS AND METHOD FOR TRANSMITTING/RECEIVING UPLINK CONTROL CHANNELS IN A WIRELESS COMMUNICATION SYSTEM

(75) Inventors: Joon-Young Cho, Suwon-si (KR); Aris Papasakellariou, Dallas, TX (US); Hwan-Joon Kwon, Suwon-si (KR); Jin-Kyu Han, Seoul (KR); Yong-Jun Kwak, Yongin-si (KR); Youn-Hyoung Heo, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1069 days.

(21) Appl. No.: 12/171,709

(22) Filed: Jul. 11, 2008

(65) Prior Publication Data
US 2009/0041139 A1    Feb. 12, 2009

(30) Foreign Application Priority Data
Jul. 13, 2007 (KR) .................. 10-2007-0070792

(51) Int. Cl.
*H04B 1/00* (2006.01)
(52) U.S. Cl. ........................... 375/130; 370/208
(58) Field of Classification Search .................. 375/130, 375/285, 295; 370/208–209
See application file for complete search history.

(56) References Cited

U.S. PATENT DOCUMENTS

| | | | |
|---|---|---|---|
| 5,553,075 A | 9/1996 | Westin | |
| 7,551,546 B2 * | 6/2009 | Ma et al. | 370/208 |
| 7,983,631 B2 * | 7/2011 | Rofougaran | 455/91 |
| 2003/0016759 A1 * | 1/2003 | Hottinen et al. | 375/267 |
| 2004/0179626 A1 * | 9/2004 | Ketchum | 375/265 |
| 2004/0252662 A1 | 12/2004 | Cho | |
| 2007/0054691 A1 * | 3/2007 | Sankar et al. | 455/522 |
| 2007/0113159 A1 * | 5/2007 | Lakkis | 714/783 |
| 2008/0043867 A1 * | 2/2008 | Blanz et al. | 375/260 |
| 2009/0022135 A1 * | 1/2009 | Papasakellariou et al. | 370/344 |
| 2010/0014487 A1 * | 1/2010 | Attar et al. | 370/335 |
| 2010/0227615 A1 * | 9/2010 | Gaal et al. | 455/436 |
| 2011/0058592 A1 * | 3/2011 | Seki et al. | 375/142 |
| 2011/0209035 A1 * | 8/2011 | Lakkis | 714/783 |
| 2011/0211653 A1 * | 9/2011 | Diaz Fuente et al. | 375/295 |

FOREIGN PATENT DOCUMENTS

| | | |
|---|---|---|
| KR | 1020070073608 | 7/2007 |
| RU | 2 139 636 | 10/1999 |
| WO | WO 2006/105005 | 10/2006 |

OTHER PUBLICATIONS

Nokia Siemens Networks, Nokia, "Performance of CQI+ACK/NACK Transmission on PUCCH", R1-073003, 3GPP TSG RAN WG1 Meeting #49bis, Jun. 25, 2007.

Motorola, "Uplink Transmission of CQI and Ack/NACK", R1-072706, 3GPP TSG RAN1 #49-bis, Jun. 25, 2007.

Samsung, "On Handling Simultaneous UE Transmission of ACK/NAK and CQI", 3GPP TSG RAN WG1 Meeting #49bis, R1-073125, Jun. 25, 2007.

* cited by examiner

*Primary Examiner* — Jean B Corrielus
(74) *Attorney, Agent, or Firm* — The Farrell Law Firm, P.C.

(57) ABSTRACT

A method and apparatus for transmitting/receiving pilot symbols for demodulation of control channel information in the uplink of a wireless communication system are provided. When an Evolved Node B (ENB) expects to receive both the Channel Quality Information (CQI) and the Acknowledgement (ACK)/Negative ACK (NACK) from a User Equipment (UE) in a certain subframe, if the UE transmits only the CQI channel, the ENB is prevented to detect the nonexistent ACK/NACK information from the CQI channel, thereby avoiding false alarm.

16 Claims, 11 Drawing Sheets

APPARATUS AND METHOD FOR TRANSMITTING/RECEIVING UPLINK CONTROL CHANNELS IN A WIRELESS COMMUNICATION SYSTEM

PRIORITY

This application claims priority under 35 U.S.C. §119(a) to a Korean Patent Application filed in the Korean Intellectual Property Office on Jul. 13, 2007 and assigned Serial No. 2007-70792, the disclosure of which is incorporated herein by reference.

BACKGROUND OF THE INVENTION

1. Field of the Invention

The present invention relates generally to an apparatus and method for transmitting/receiving control channels in a wireless communication system, and more particularly, to an apparatus and method for transmitting/receiving control channels on the uplink in a mobile communication system

2. Description of the Related Art

Generally, mobile communication systems have been developed to support communication while guaranteeing mobility for users. Due to the rapid progress of the communication technologies, such mobile communication systems are developing into advanced communication systems capable of supporting not only the voice communication, but also the high-speed data communication. Now, the mobile communication system has evolved to support higher-speed data communication, an example of which is an Enhanced Universal Terrestrial Radio Access (EUTRA) system, which is the next generation mobile communication standard proposed by $3^{rd}$ Generation Partnership Project (3GPP).

Mobile communication systems can be classified into various types, such as Time Division Multiple Access (TDMA), Code Division Multiple Access (CDMA) and Frequency Division Multiple Access (FDMA). Among them, CDMA has been generally used. However, since CDMA has difficulty in supporting a large volume of data at high speed due to the limited number of orthogonal codes, Orthogonal Frequency Division Multiple Access (OFDMA) and Single Carrier-Frequency Division Multiple Access (SC-FDMA), which are a kind of FDMA, are now applied as downlink and uplink standard technologies of EUTRA, respectively.

In the EUTRA system, uplink control information includes Acknowledgement (ACK)/Negative ACK (NACK) feedback information, which is a signal used for feeding back success/failure in reception of downlink transmission data. The uplink control information also includes Channel Quality Indication (CQI) information used for feeding back downlink channel quality. The ACK/NACK information, which is generally composed of 1 bit, is repeatedly transmitted several times for improvement of its reception performance and expansion of the cell coverage. ACK/NACK is defined herein as ACK or NACK.

Generally, the CQI information is composed of multiple bits to express the channel quality, and is transmitted after undergoing channel coding for reception performance improvement and cell coverage expansion. Block coding or convolutional coding is available as the channel coding for the CQI information. A reception reliability required in receiving the control information is determined according to the type of the control information. Generally, ACK/NACK, which requires a Bit Error Rate (BER) of about $10^{-2} \sim 10^{-4}$, is lower in required BER than CQI, which requires a BER of $10^{-2} \sim 10^{-1}$.

In the EUTRA system, when a User Equipment (UE), or a mobile station, transmits only the uplink control information channel without data, it uses an allocated particular frequency band for control information transmission. A physical channel for transmitting only the control information is defined as Physical Uplink Control Channel (PUCCH), and the PUCCH is mapped to the allocated particular frequency band.

FIG. 1 is a diagram illustrating a transmission structure for a physical channel PUCCH for transmitting control information on the uplink in a 3GPP EUTRA system.

In FIG. 1, the vertical axis represents a frequency domain and the horizontal axis represents a time domain. A scope of the time domain is shown as one subframe 102, while a scope of the frequency domain is shown as a system transmission bandwidth 110. The subframe 102, which is a basic transmission unit of the uplink, has a 1-ms length, and one subframe is composed of two 0.5-ms slots 104 and 106. Slots 104 and 106 are each composed of multiple SC-FDMA symbols 111~124, and 131~144, respectively. FIG. 1 illustrates an example where one slot is composed of 7 SC-FDMA symbols.

The minimum unit of the frequency domain is a subcarrier, and the basic unit of resource allocation is a Resource Block (RB), 108 and 109. The RBs 108 and 109 are composed of multiple subcarriers and multiple SC-FDMA symbols. In the example shown in FIG. 1, 12 subcarriers and 14 SC-FDMA symbols constituting 2 slots form one RB. Even in the downlink to which OFDM transmission is applied, one RB is generated from 12 subcarriers and 14 OFDM symbols.

Frequency bands, to which the PUCCHs are mapped, correspond to RBs 108 and 109 situated on both ends of the system transmission bandwidth 110. The PUCCH can undergo frequency hopping to increase its frequency diversity during one subframe, and in this case, slot-by-slot hopping is possible. An Evolved Node B (ENB), or base station, can occasionally allocate multiple RBs for PUCCH transmission to approve transmission of control information from multiple users. In FIG. 1, the frequency hopping is shown by reference numeral 150 and reference numeral 160. A detailed description of the frequency hopping is provided below.

Control information #1, which was transmitted through the pre-allocated RB 108 in the first slot 104, is transmitted through another pre-allocated RB 109 after undergoing frequency hopping in the second slot 106. On the contrary, control information #2, which was transmitted through the pre-allocated RB 109 in the first slot 104, is transmitted through another pre-allocated RB 108 after undergoing frequency hopping in the second slot 106.

In the example of FIG. 1, in one subframe 102, the control information #1 is transmitted on SC-FDMA symbols 111, 113, 114, 115, 117, 138, 140, 141, 142 and 144, and the control information #2 is transmitted on SC-FDMA symbols 131, 133, 134, 135, 137, 118, 120, 121, 122 and 124. Reference Signals (RSs), also known as pilots, are transmitted in Pilot SC-FDMA symbols 112, 116, 139 and 143 (or 132, 136, 119 and 123). The RS is generated with a predetermined sequence, and used for channel estimation for coherent demodulation at a receiver. In FIG. 1, the number of SC-FDMA symbols for control information transmission, the number of SC-FDMA symbols for RS transmission, and their positions in the subframe are shown by way of example, and these are subject to change according to the types of desired transmission control information and/or the system operation.

Code Division Multiplexing (CDM) can be used to multiplex uplink control information for different users, such as ACK/NACK information, CQI information, and Multiple Input Multiple Output (MIMO) feedback information transmitted over PUCCH. CDM is robust against interference signals compared with Frequency Division Multiplexing (FDM).

A Zadoff-Chu (ZC) sequence is under discussion as a sequence to be used for CDM-multiplexing the control information. Since the ZC sequence has a constant signal amplitude in the time and frequency domains, it has a good Peak-to-Average Power Ratio (PAPR) characteristic and shows excellent channel estimation performance in the frequency domain. Further, the ZC sequence has a characteristic that a circular autocorrelation for a non-zero shift is zero (0). Therefore, UEs transmitting control information using the same ZC sequence can be identified using different cyclic shift values of the ZC sequence.

In the actual wireless channel environment, different cyclic shift values are set for the users intending to undergo multiplexing so as to satisfy a condition that they are greater than the maximum transmission delay of the wireless transmission path, thereby maintaining inter-user orthogonality. Therefore, the number of users capable of multiple access is determined from the length and cyclic shift values of the ZC sequence. The ZC sequence can be applied even to the SC-FDMA symbols for RS transmission, to identify RSs of different UEs using the cyclic shift values.

Generally, a length of the ZC sequence used for the PUCCH is assumed to be 12 samples, which is equal to the number of subcarriers constituting one RB. In this case, since the maximum possible number of different cyclic shift values of the ZC sequence is 12, it is possible to multiplex a maximum of 12 PUCCHs to one RB by allocating different cyclic shift values to the PUCCHs. The Typical Urban (TU) model, which is the wireless channel model generally considered in the EUTRA system, applies cyclic shift values to PUCCHs at intervals of at least 2 samples due to the frequency-selective channel characteristic. Applying the cyclic shift values at intervals of at least 2 samples in this way restricts the number of cyclic shift values within one RB to 6 or less. In this manner, the orthogonality between PUCCHs that are mapped to cyclic shifts on a one-to-one basis can be maintained without its abrupt loss.

FIG. 2 illustrates an example of multiplexing CQIs for users with different cyclic shift values of the ZC sequence within the same RB when transmitting CQIs over the PUCCHs having the structure of FIG. 1.

In FIG. 2, the vertical axis represents cyclic shift values 200 of a ZC sequence. In the TU model assumed as the wireless channel, since the maximum number of channels that can undergo multiplexing without an abrupt orthogonality loss within one RB is 6, there is shown an occasion where 6 CQIs 202, 204, 206, 208, 210 and 212 undergo multiplexing. In the example of FIG. 2, the same RB and the same ZC sequence are used for transmission of the CQI information in such a manner that CQI 202 from UE #1 is transmitted using a cyclic shift '0' 214; CQI 204 from UE #2 is transmitted using a cyclic shift '2' 218; CQI 206 from UE #3 is transmitted using a cyclic shift '4' 222; CQI 208 from UE #4 is transmitted using a cyclic shift '6' 226; CQI 210 from UE #5 is transmitted using a cyclic shift '8' 230; and CQI 212 from UE #6 is transmitted using a cyclic shift '10' 234. With reference to FIG. 1, a description will be made as to how the control information signal is mapped to the ZC sequence during CDM transmission of the control information based on the ZC sequence. A length-N ZC sequence for UE #i is defined as $g(n+\Delta i) \bmod N$, where $n=0, \ldots, N-1$, $\Delta i$ denotes a cyclic shift value for UE #i, and i denotes a UE index used for identifying a UE. Also, a control information signal that a UE #i intends to transmit is defined as $m_{i,k}$, where $k=1, \ldots$, Nsym. If Nsym denotes the number of SC-FDMA symbols for control information transmission within one subframe, a signal $c_{i,k,n}$ ($n^{th}$ sample of a $k^{th}$ SC-FDMA symbol of UE #i) mapped to each SC-FDMA symbol is defined as Equation (1).

$$c_{i,k,n} = g(n+\Delta i) \bmod N \times m_{i,k} \qquad (1)$$

where $k=1, \ldots$, Nsym, $n=0, 1, \ldots, N-1$, and $\Delta i$ denotes a cyclic shift value of a ZC sequence for a UE #i.

In the example of FIG. 1, in one subframe, the number Nsym of SC-FDMA symbols for control information transmission is 10, excluding the 4 SC-FDMA symbols for RS transmission, and a length N of the ZC sequence is 12, which is equal to the number of subcarriers constituting one RB. From the standpoint of one UE, a cyclic-shifted ZC sequence is applied to each SC-FDMA symbol, and its desired transmission control information signal is generated in such a manner that one modulation symbol is multiplied by the ZC sequence cyclic-shifted in the time domain at every SC-FDMA symbol for control information transmission. Therefore, a maximum of Nsym control information modulation symbols can be transmitted per subframe. That is, in the example of FIG. 1, a maximum of 10 control information modulation symbols can be transmitted during one subframe.

It is possible to increase the multiplexing capacity of PUCCHs for transmitting the control information by additionally applying time-domain orthogonal covers, aside from the CDM control information transmission based on the ZC sequence. A Walsh sequence can be an example of the orthogonal cover. There are M orthogonal sequences as length-M orthogonal covers. Specifically, for the 1-bit control information like ACK/NACK, its multiplexing capacity can be increased by applying time-domain orthogonal covers to the SC-FDMA symbols to which ACK/NACK is mapped during transmission. The EUTRA system considers that the PUCCH for ACK/NACK transmission uses 3 SC-FDMA symbols for RS transmission per slot for improvement of channel estimation performance. Therefore, in the example of FIG. 1 where one slot is composed of 7 SC-FDMA symbols, 4 SC-FDMA symbols for ACK/NACK transmission are available. The orthogonality loss caused by a change in wireless channels can be minimized by restricting the time interval, where the time-domain orthogonal covers are applied, to one slot or less. Length-4 orthogonal covers are applied to the 4 SC-FDMA symbols for ACK/NACK transmission, and length-3 orthogonal covers are applied to the 3 SC-FDMA symbols for RS transmission.

Regarding the ACK/NACK and RS, their users can be identified with cyclic shift values of the ZC sequence, and the additional user identification is possible by the orthogonal covers. For coherent reception of ACK/NACK, since there should exist RSs that are mapped to ACK/NACK on a one-to-one basis, the multiplexing capacity of ACK/NACK signals is restricted by the RSs mapped to ACK/NACK. For example, in the TU channel model where 6 cyclic shift values are considered per RB, since different length-3 time-domain orthogonal covers can be applied to cyclic shifts of the ZC sequence, which are applied to RSs, RSs from a maximum of 18 different users can undergo multiplexing. Regarding ACK/NACK, since it is mapped to RSs on a one-to-one basis, a maximum of 18 ACK/NACK signals can be multiplexed per RB. In this case, there are 4 length-4 orthogonal covers applied to ACK/NACK, and among them, 3 orthogonal covers are used. The orthogonal covers applied to ACK/NACK can be recognized in common between a UE and an ENB under agreement previously made therebetween, or by signaling. As a result, it is possible to increase the multiplexing capacity three times compared with the case where the time-domain orthogonal covers are unused.

FIG. 3 illustrates an example of multiplexing ACK/NACK for each user with different cyclic shift values of the ZC sequence and additional time-domain orthogonal covers in the same RB in the PUCCH structure for ACK/NACK transmission.

In FIG. 3, the vertical axis represents cyclic shift values 300 of a ZC sequence, and the horizontal axis represents time-domain orthogonal covers 302. In the TU model assumed as the wireless channel, if the maximum number of cyclic shifts that can undergo multiplexing without an abrupt orthogonality loss within one RB is 6, and 3 length-4 orthogonal covers 364, 366 and 368 are additionally used, a maximum of 18 (=6*3) ACK/NACK signals 304, 306, 308, 310, 312, 314, 316, 318, 320, 322, 324, 326, 328, 330, 332, 334, 336 and 338 can undergo multiplexing. In the example of FIG. 3, the same RB and the same ZC sequence are used for ACK/NACK transmission in such a manner that ACK/NACK 304 from UE #1 is transmitted using a cyclic shift '0' 340 and an orthogonal cover '0' 364; ACK/NACK 306 from UE #2 is transmitted using a cyclic shift '0' 340 and an orthogonal cover '1' 366; ACK/NACK 308 from UE #3 is transmitted using a cyclic shift '0' 340 and an orthogonal cover '2' 368; . . . ; ACK/NACK 334 from UE #16 is transmitted using a cyclic shift '10' 360 and an orthogonal cover '0' 364; ACK/NACK 336 from UE #17 is transmitted using a cyclic shift '10' 360 and an orthogonal cover '1' 366; and ACK/NACK 338 from UE #18 is transmitted using a cyclic shift '10' 360 and an orthogonal cover '2' 368. The orthogonal covers 364, 366 and 368 are length-4 orthogonal codes satisfying orthogonality therebetween.

In transmitting the CQI or ACK/NACK through the PUCCH in this way, there is a possible case where one UE should simultaneously transmit CQI and ACK/NACK within one subframe. In its most typical case, several subframes before it transmits CQI, a UE receives its scheduled downlink data channel from an ENB over a downlink control channel. Upon receipt of the downlink control channel, the UE receives the data from the RB where the downlink data is transmitted, decodes the received data, and transmits ACK/NACK corresponding to the decoding result. If the subframe where the UE should transmit the ACK/NACK is coincident in timing with the subframe where it should transmit CQI, the UE must transmit the ACK/NACK and CQI together within the subframe. The UE should transmit RS even when transmitting the ACK/NACK and CQI. However, since such matters have not been discussed yet in the standard, there is a need for a transmission/reception apparatus and method for simultaneous transmission of ACK/NACK and CQI, and simultaneous transmission of RS.

In this case, even when a UE has failed in reception of the scheduling control channel transmitted over the downlink, the UE can transmit only the CQI channel. Then, though the ENB waits for reception of ACK/NACK information for the scheduling control channel, the UE transmits CQI information in reality. In this case, even though the UE has transmitted only the CQI information, the ENB may misrecognize that it has received ACK/NACK information and CQI information from the UE. Further, the ENB may detect the nonexistent ACK/NACK information from the CQI channel, generating an error. Therefore, the ENB may misrecognize the control information transmitted from the UE, probably causing a communication failure.

SUMMARY OF THE INVENTION

The present invention has been made to address at least the above problems and/or disadvantages and to provide at least the advantages described below. Accordingly, an aspect of the present invention provides an apparatus and method for transmitting/receiving control symbols for corresponding information when one UE simultaneously transmits ACK/NACK and CQI information in a wireless communication system.

Another aspect of the present invention provides a control symbol transmission/reception apparatus and method for solving the problem of an ENB misrecognizing the CQI channel transmitted by a UE as ACK/NACK information, when the UE has failed to receive its downlink scheduling control channel.

A further aspect of the present invention provides a control information transmission/reception apparatus and method for correctly recognizing the control information exchanged between a UE and an ENB.

According to one aspect of the present invention, a method is provided for transmitting a first type of information bits using a signal in a communication system. The signal comprises one or more slots, and a slot comprises a first number and a second number of symbols. A reference signal is transmitted in the first number of symbols and a second type of information bits is transmitted in the second number of symbols. The first number of symbols is modulated by a first orthogonal cover if the first number of symbols has a first value. The first number of symbols is modulated by a second orthogonal cover if the first number of symbols has a second value. The first number of symbols is transmitted.

According to another aspect of the present invention, an apparatus is provided for transmitting a first type of information bits using a signal in a communication system. The signal comprises one or more slots, and a slot comprises a first number and a second number of symbols. A reference signal is transmitted in the first number of symbols and a second type of information bits is transmitted in the second number of symbols. The transmission apparatus includes a multiplier unit for modulating the first number of symbols by a first orthogonal cover if the first number of symbols has a first value, and for modulating the first number of symbols by a second orthogonal cover if the first number of symbols has a second value. The transmission apparatus also includes a transmitter unit for transmitting the first number of symbols.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Figure 1:
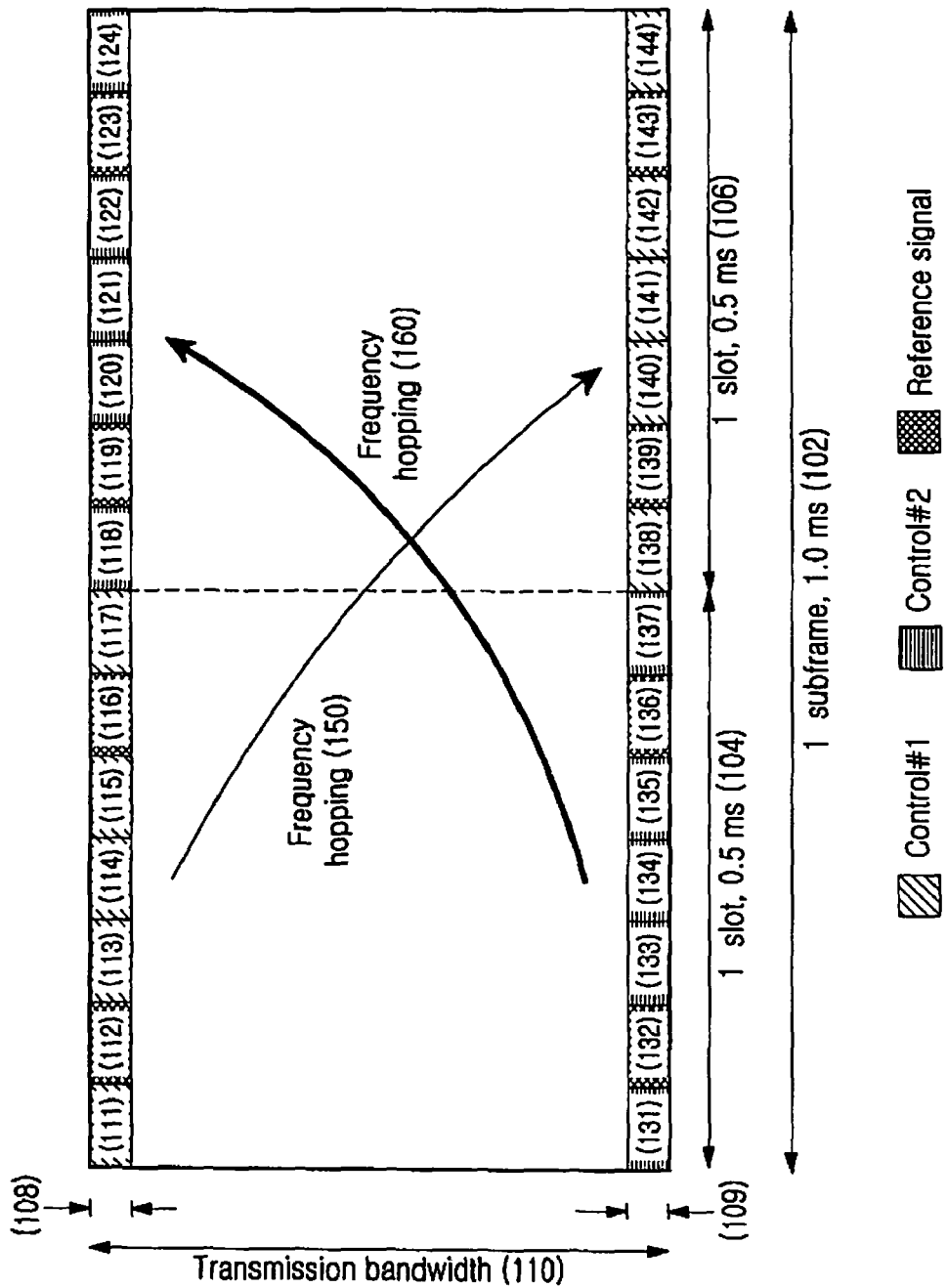
FIG. 1 is a diagram illustrating a structure of a EUTRA uplink control channel.
Figure 2:
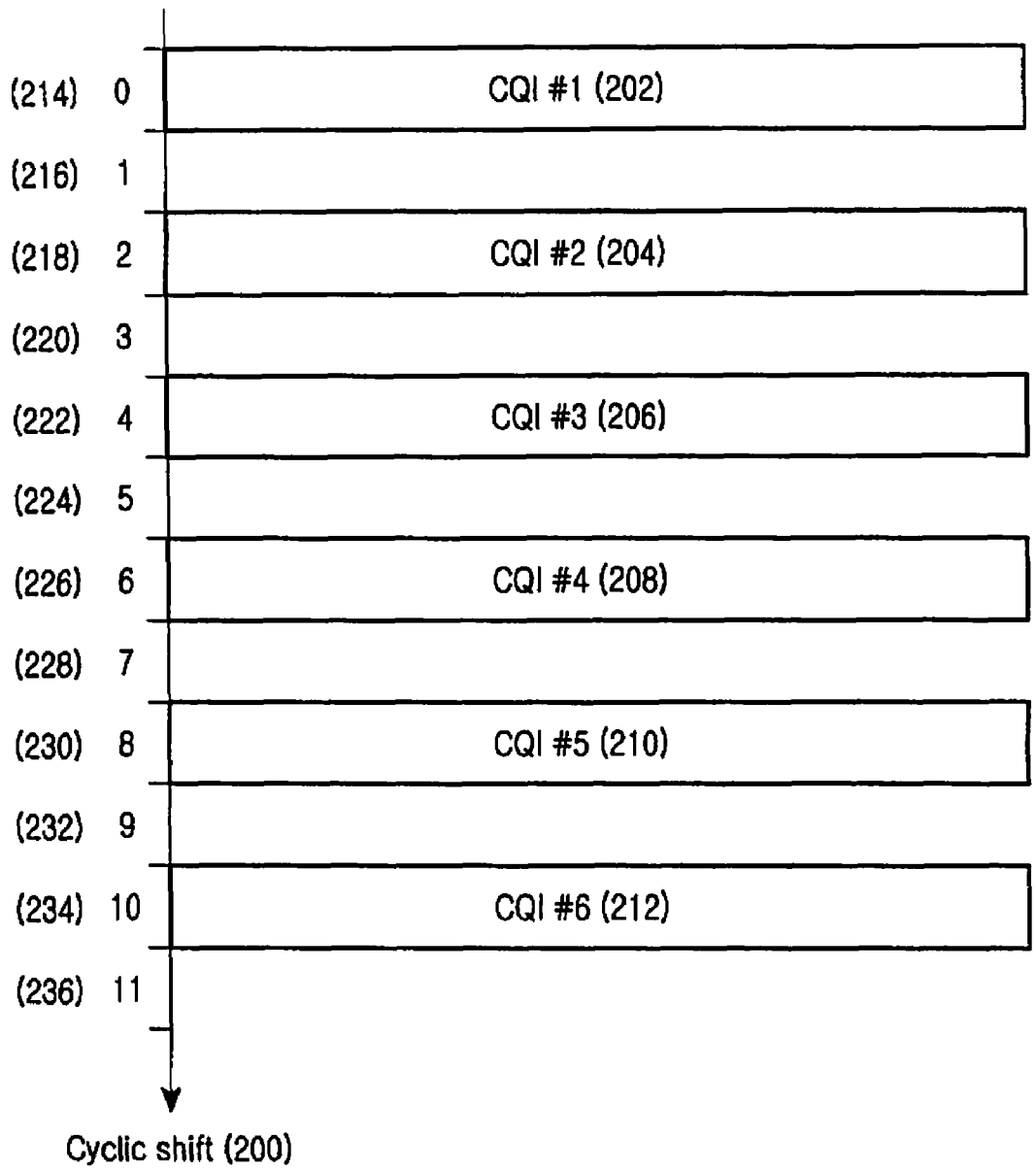
FIG. 2 is a diagram illustrating a multiplexing structure of a CQI channel in the EUTRA uplink.
Figure 3:
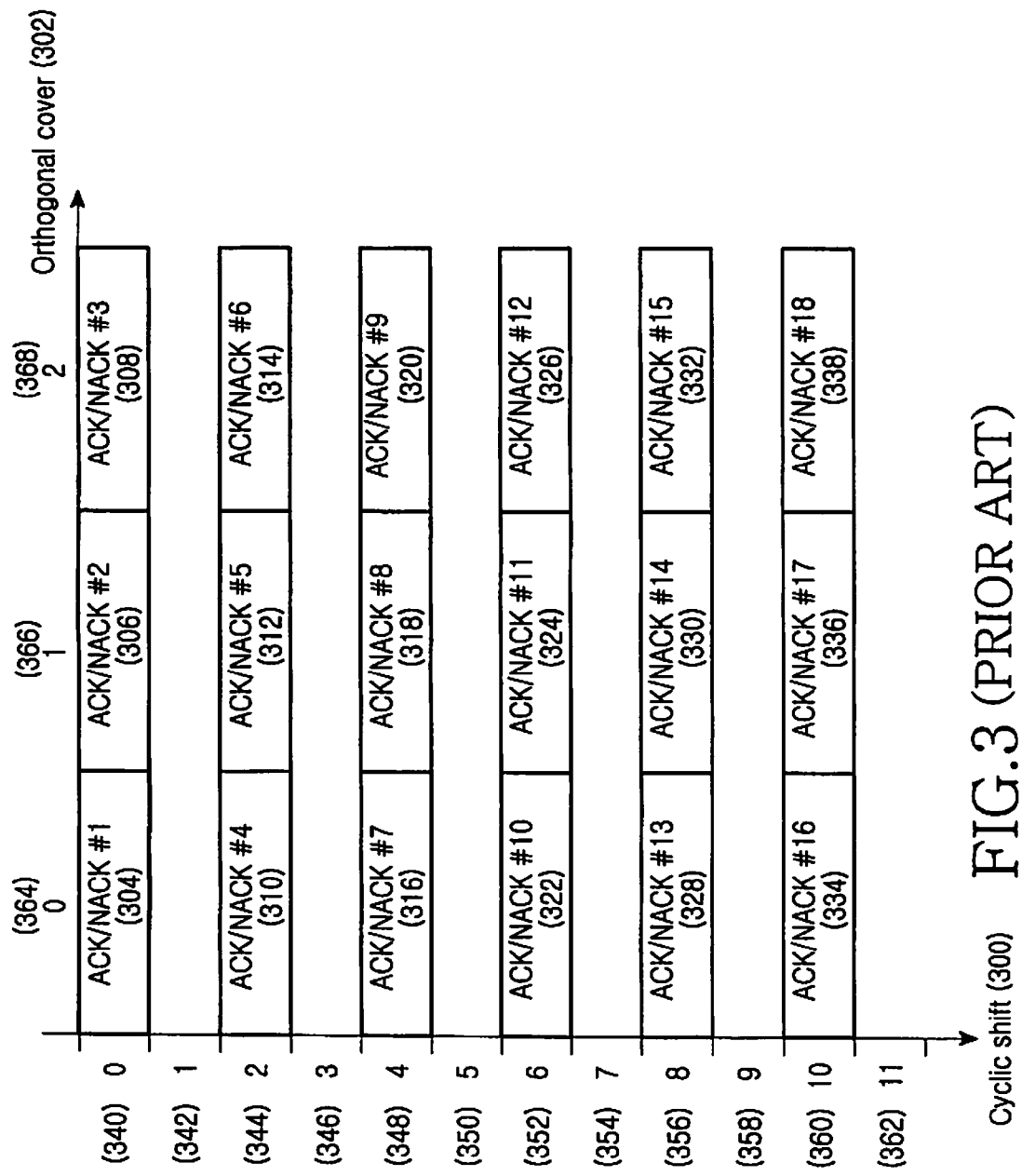
FIG. 3 is a diagram illustrating a multiplexing structure of an ACK/NACK channel in the EUTRA uplink.

Preferred embodiments of the present invention are described in detail with reference to the accompanying drawings. Similar components are designated by similar reference numerals although they are illustrated in different drawings. Detailed descriptions of constructions or processes known in the art may be omitted to avoid obscuring the present invention. Terms used herein are defined based on functions in the present invention and may vary according to users, operators' intention or usual practices. Therefore, the definition of the terms should be made based on contents throughout the specification.

In the following description, the present invention provides an apparatus and method for transmitting/receiving RS symbols transmitted together with control information when one UE should simultaneously transmit the control information such as ACK/NACK and CQI information.

When a UE receives its scheduled downlink data channel from an ENB over a downlink control channel several subframes before the UE transmits CQI, the ENB, expecting that the UE will transmit both the CQI and ACK/NACK information in the corresponding subframe, performs a reception operation according thereto. However, upon failure in reception of the downlink control channel, the UE transmits only the CQI information in the subframe. In this case, since the ENB misrecognizes that ACK/NACK and CQI information together underwent channel coding or Time Division Multiplexing (TDM) in the uplink control channel received from the UE, even though no ACK/NACK information is included in the control channel, the ENB may detect ACK/NACK information, generating an error. Then the ENB may undesirably discard the data packet and schedule the next new data packet to the UE, misrecognizing that the UE has successfully received the scheduled data packet by the downlink scheduling channel.

The present invention provides an RS symbol transmission/reception method and apparatus for preventing a false alarm that when an ENB expects to receive both CQI and ACK/NACK from a UE in a certain frame, if the UE transmits only the CQI channel, the ENB detects the nonexistent ACK/NACK information from the CQI channel. The present invention applies different RS symbol patterns for a case where the UE transmits only the CQI channel, and another case where the UE transmits both CQI and ACK/NACK information. Therefore, even though the UE transmitted only the CQI information, if the ENB estimates a channel from an RS symbol, misrecognizing that CQI and ACK/NACK information were transmitted together, it acquires a channel estimate different from the actual channel, preventing the channel compensation from being abnormally achieved. As a result, the present invention prevents occurrence of an error that the ENB receiver falsely detects the ACK/NACK information from the CQI channel transmitted by the UE.

Although embodiments of the present invention will be described in detail herein with reference to an OFDM-based cellular wireless communication system, it will be obvious to those skilled in the art that the main idea of the present invention can be applied to other communication systems having similar technical background and channel format with a slight modification without departing from the scope of the present invention.

A detailed description will now be made of the uplink RS symbol transmission/reception method and apparatus according to three different embodiments of the present invention.

Figure 4:
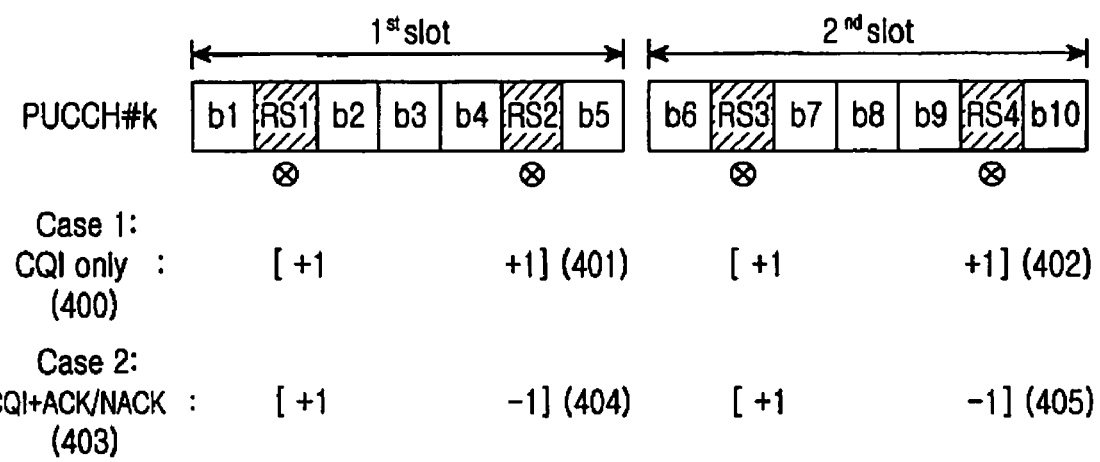
FIG. 4 is a diagram illustrating an RS structure for transmission of uplink CQI information according to an embodiment of the present invention.

FIG. 4 illustrates a subframe structure of an uplink control channel for a case only the CQI is transmitted, or CQI and ACK/NACK are transmitted together according to an embodiment of the present invention. Although not illustrated in detail in FIG. 4, in the RB where PUCCH #k is transmitted, PUCCH for transmitting CQI or ACK/NACK of a different UE can be transmitted using a different cyclic shift of the ZC sequence from that of the PUCCH #k. In FIG. 4, only PUCCH #k is shown by way of example. In FIG. 4, b1, b2, ..., b10 represent modulation symbols of control information transmitted over the control channel, and RS1, RS2, RS3 and RS4 represent RS symbols used for demodulating the control information modulation symbols at a receiver. As described above, in the EUTRA uplink, the symbols each are transmitted after being multiplied by a length-12 ZC sequence.

The channel structure shown in FIG. 4 has a characteristic that it has different RS symbol patterns for a case where only CQI is transmitted through the control channel symbols b1, b2, ..., b10, and another case where CQI and ACK/NACK information are transmitted together through the symbols. Particularly, in the example of FIG. 4, particular RS symbols (RS2 and RS4 in FIG. 4) have an orthogonal relation with each other in order to distinguish the case where only CQI is transmitted from the case where CQI and ACK/NACK information are transmitted together. That is, in case 400 where only CQI is transmitted, two RS symbols of each slot have patterns 401 and 402 of [+1 +1]. However, in case 403 where CQI and ACK/NACK are transmitted together, two RS symbols of each slot have patterns 404 and 405 of [+1 −1].

As the UE transmits RS symbols of different patterns to the ENB according to the possible cases in this way, the ENB can remarkably reduce the false alarm probability for the ACK/NACK information. For instance, since the UE has failed in reception of the downlink scheduling control channel transmitted by the ENB, when the UE transmits only the CQI information in the corresponding subframe by applying the RS symbol patterns 401 and 402, the ENB receiver performs channel estimation on the assumption that the UE transmitted both CQI and ACK/NACK information for the downlink control channel by applying the RS symbol patterns 404 and 405. Thus, the ENB obtains totally irrelevant channel estimates, so that it cannot normally demodulate and decode the symbols transmitted by the UE. Since the RS symbol patterns 401 and 404 have an orthogonal relation with each other, a Signal-to-Noise Ratio (SNR) of the channel estimates obtained when the ENB receiver applies wrong RS symbol patterns, is very low so that normal demodulation is impossible. That is, the present invention applies different RS symbol patterns having orthogonality for the case where only CQI is transmitted and the case where CQI and ACK/NACK are transmitted together. This noticeably reduces the possible error that the ENB falsely detects ACK/NACK and CQI information as it makes wrong channel estimation from RS symbols, when it has wrong information on the control channel format applied by the UE.

In this embodiment of the present invention, the RS symbol patterns 401 and 402 applied for the case 400, and the RS symbol patterns 404 and 405 applied for the case 403 are given herein by way of example, and other patterns can also be applied.

Figure 5:
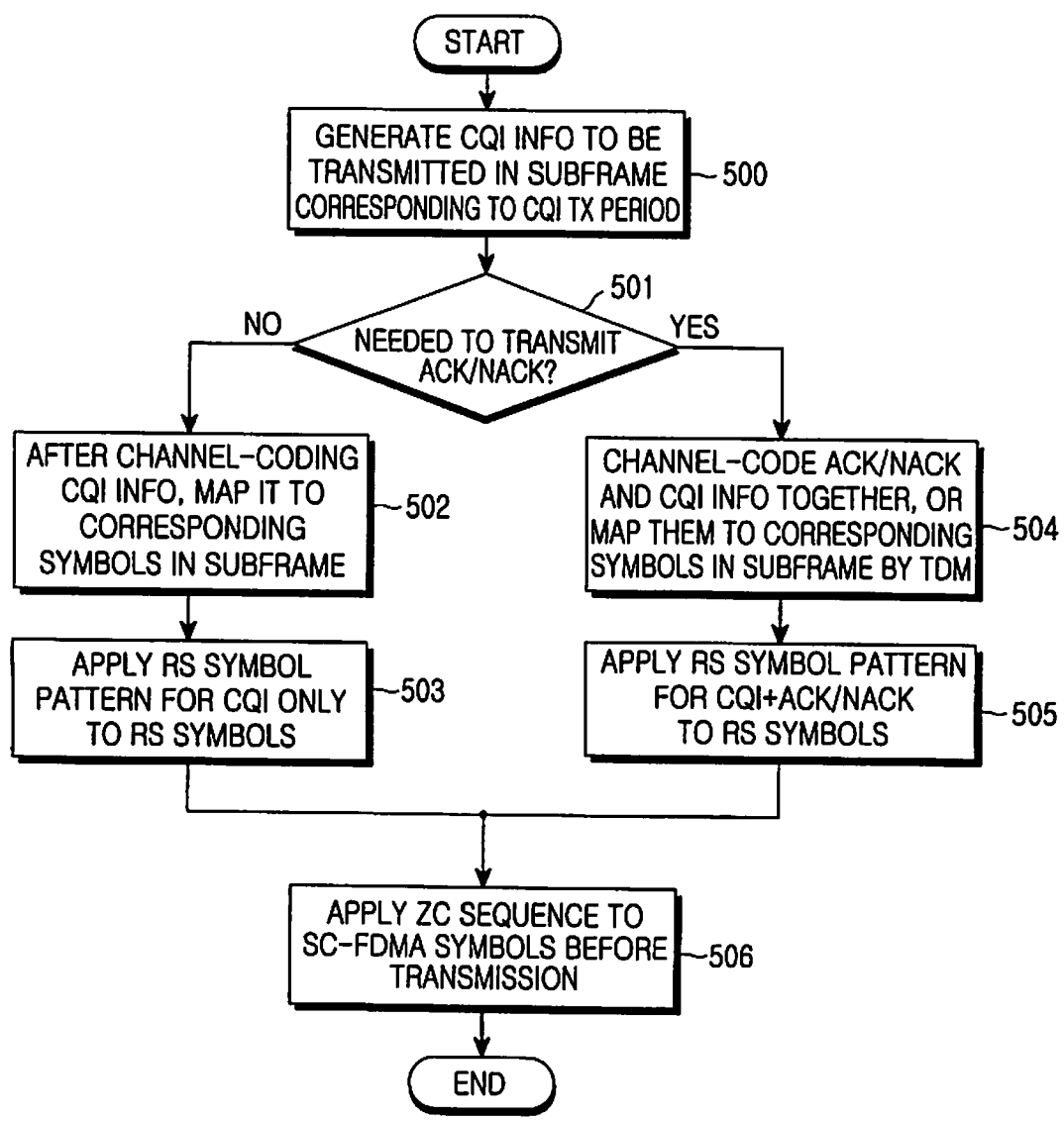
FIG. 5 is a diagram illustrating a UE's transmission procedure according to an embodiment of the present invention.

FIG. 5 illustrates a transmission procedure of a UE according to an embodiment of the present invention.

In step 500, the UE generates CQI information it will transmit in a corresponding subframe, at a transmission period for CQI information. Thereafter, in step 501, the UE determines if there is a need to transmit ACK/NACK information and CQI information together in the subframe. For instance, if the UE received a downlink data packet in the previous subframe, it can transmit ACK/NACK information for the decoding result in the corresponding subframe. However, if the UE has not perceived receipt of the downlink data packet, since it failed to receive a downlink control channel for the downlink data packet, or if the ENB has scheduled no downlink data packet to the UE, the UE does not need the ACK/NACK transmission. When there is no need for ACK/NACK transmission in the subframe, the UE channel-codes the CQI information, and then maps it to the corresponding symbols (i.e., symbols b1, b2, . . . , b10 in FIG. 4) in the subframe in step 502. Thereafter, in step 503, the UE applies, to the RS symbols, the RS symbol patterns (401 and 402 in FIG. 4) corresponding to the case where only CQI is transmitted.

However, when there is a need to transmit ACK/NACK information and CQI together in the subframe, the UE channel-codes the ACK/NACK information and CQI together, or maps them to the corresponding symbols b1, b2, . . . , b10 in the subframe by TDM, in step 504, and applies the RS symbol patterns (404 and 405 in FIG. 4) corresponding to the above case to the RS symbols in step 505. Finally, in step 506, the UE transmits SC-FDMA symbols by multiplying their associated ZC sequences thereto.

Figure 6:
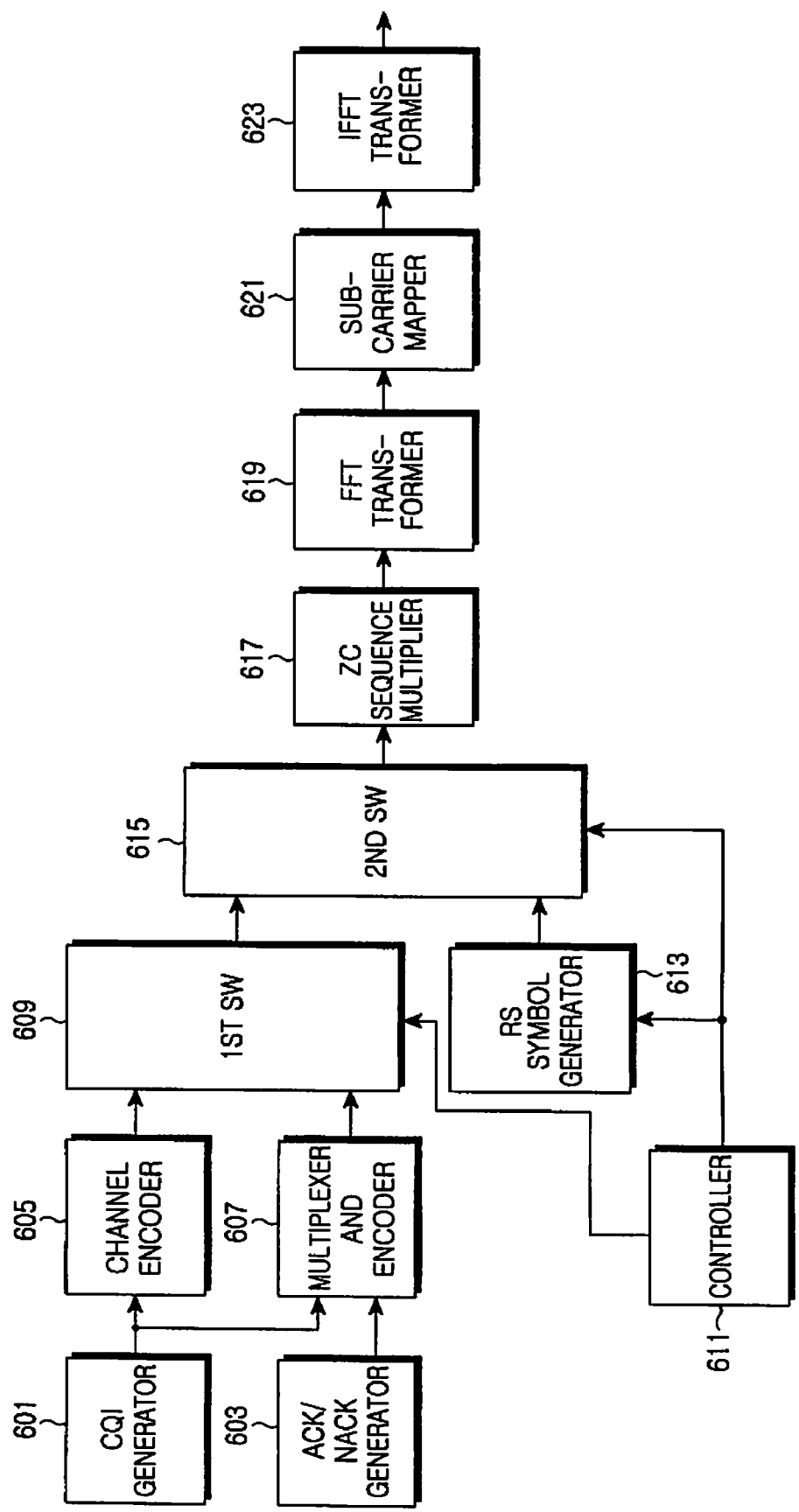
FIG. 6 is a diagram illustrating a structure of a UE's transmission apparatus according to an embodiment of the present invention.

FIG. 6 is a block diagram illustrating a structure of a UE transmission apparatus according to an embodiment of the present invention.

A CQI generator 601 and an ACK/NACK generator 603 generate CQI and ACK/NACK to be transmitted, respectively. The CQI generated by the CQI generator 601 is input to a channel encoder 605 or a multiplexer and encoder 607. The channel encoder 605 channel-codes a CQI value when only the CQI is transmitted. However, when CQI and ACK/NACK are simultaneously transmitted, the CQI generated by the CQI generator 601 and the ACK/NACK generated by the ACK/NACK generator 603 are multiplexed and channel-coded in the multiplexer and encoder 607. A first switch 609, under the control of a controller 611, switches an output of the channel encoder 605 or the multiplexer and encoder 607 to a second switch 615.

As one of its important functions, the controller 611 transmits pattern control information to an RS symbol generator 613 so that RSs are generated, according to whether the UE transmits only the CQI or transmits CQI and ACK/NACK together. The second switch 615, under the control of the controller 611, inputs to a ZC sequence multiplier 617 the control information symbol output from the first switch 609 or the RS symbol output from the RS symbol generator 613 according to the position of the corresponding SC-FDMA symbol in the slot. The symbol multiplied by the ZC sequence in the ZC sequence multiplier 617, after passing through a Fast Fourier Transform (FFT) transformer 619, is input to a subcarrier mapper 621 where it inputs the control information to an IFFT transformer 623 corresponding to a transmission band. Then the IFFT transformer 623 performs IFFT transform and outputs the result to a Radio Frequency (RF) unit (not shown in FIG. 6) where it up-converts the control information to a radio band before transmission.

When the ZC sequence is a sequence defined in the frequency domain, the symbol multiplied by the ZC sequence is directly input to the subcarrier mapper 621 without the need for the FFT transformer 619.

Figure 7:
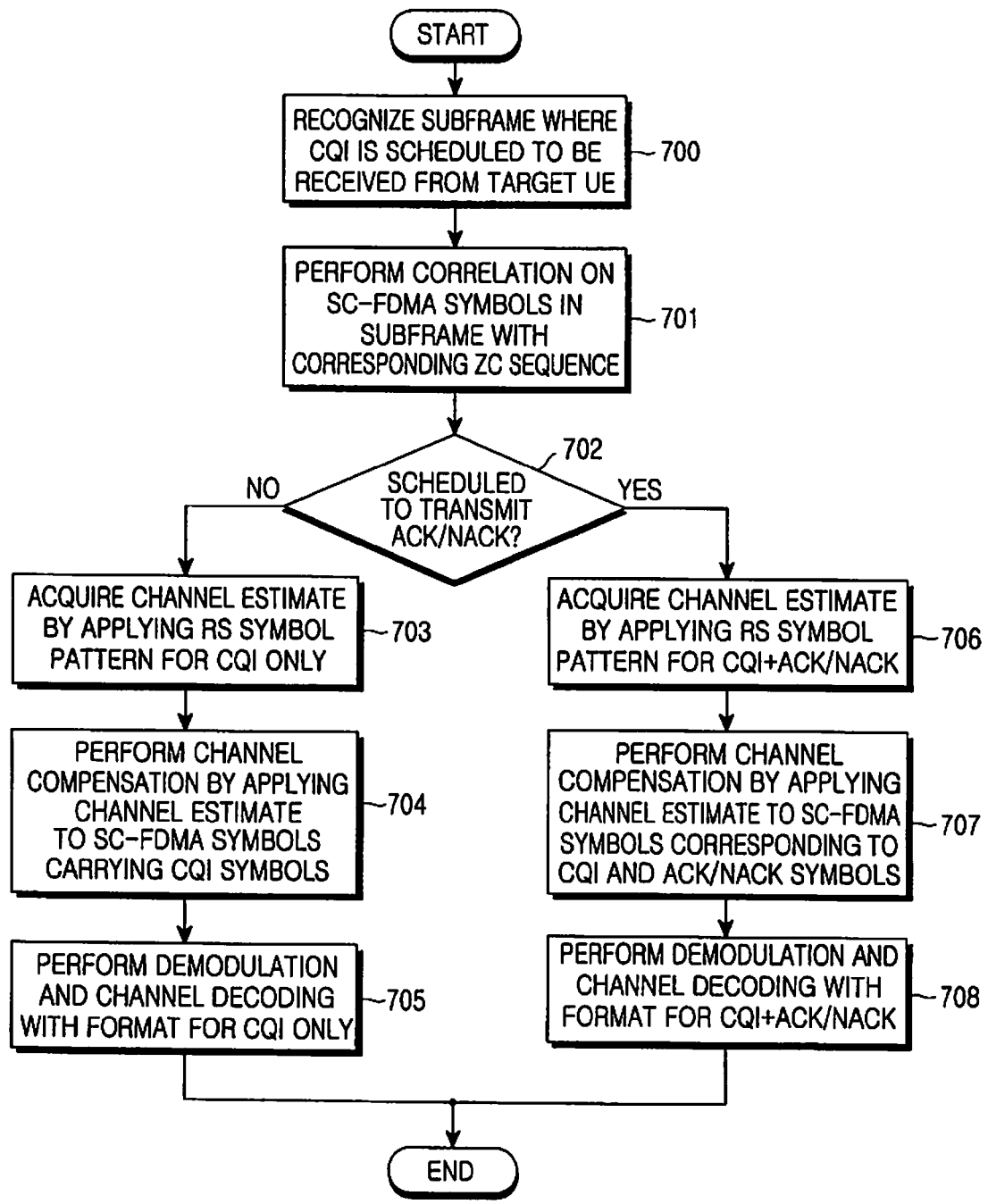
FIG. 7 is a diagram illustrating an ENB's reception procedure according to an embodiment of the present invention.

FIG. 7 is a diagram illustrating an ENB's reception procedure for CQI and ACK/NACK channels according to an embodiment of the present invention.

In step 700, the ENB recognizes a subframe where it is scheduled to receive CQI from a target UE. Then, in step 701, the ENB acquires a correlation value by performing correlation on each SC-FDMA symbol in the subframe with the corresponding ZC sequence. The correlation value, after undergoing channel compensation, becomes an estimate of a control channel modulation symbol transmitted by the corresponding SC-FDMA symbol. In step 702, the ENB determines if the UE is scheduled to transmit ACK/NACK along with the CQI in the subframe. If the UE is scheduled to transmit only the CQI in the subframe, the ENB acquires in step 703 a channel estimate by applying an RS symbol pattern corresponding to the case where it transmits only the CQI. In step 704, the ENB performs channel compensation by applying the channel estimate to the SC-FDMA symbols carrying CQI symbols. Thereafter, in step 705, the ENB performs demodulation and channel decoding on the received control channel symbols. If the ENB transmitted a downlink control channel to the UE several subframes ago, the ENB will determine that the UE will transmit CQI together with ACK/NACK information for the scheduled data packet over the control channel. If it is determined in step 702 that the UE transmitted CQI and ACK/NACK information together, the ENB acquires a channel estimate by applying an RS symbol pattern corresponding to the case in step 706, and performs channel compensation on the received control channel symbols by applying the channel estimate in step 707. Thereafter, in step 708, the ENB performs demodulation and decoding with a format corresponding to the case where CQI and ACK/NACK are transmitted together, thereby acquiring ACK/NACK information and CQI information.

If the ENB failed in the decoding, or if a correlation value with the RS symbol pattern corresponding to the case where only the CQI is transmitted is greater than the received RS symbol signal, or if a soft-decision metric of a codeword decoded after channel compensation is very low, the ENB may consider that the UE transmitted only the CQI. When the UE transmitted only the CQI and applied an RS symbol pattern according thereto, for the signal decoded through steps 706, 707 and 708, the received RS symbol correlation value and the decoded CQI and ACK/NACK symbols are very low in energy due to the use of the false RS symbol pattern. Therefore, the ENB can reattempt to demodulate the CQI by additionally performing steps 703, 704 and 705.

Meanwhile, another reception method can compare an SNR of a channel estimate obtained from the RS symbol pattern considered for the case 400 in FIG. 4 with an SNR of a channel estimate obtained from the RS symbol pattern considered for the case 403 to check which case is higher in the SNR of the channel estimate, thereby determining whether the UE applied the transmission (format) for the case 400 or the transmission for the case 403. If the ENB misrecognizes that the UE transmitted only the CQI information by applying the format for the case 400 even though the UE transmitted CQI and ACK/NACK together by applying the format for the case 403, the ENB can perceive the fact that the UE has failed to normally receive the scheduling channel for the downlink data packet.

Figure 8:
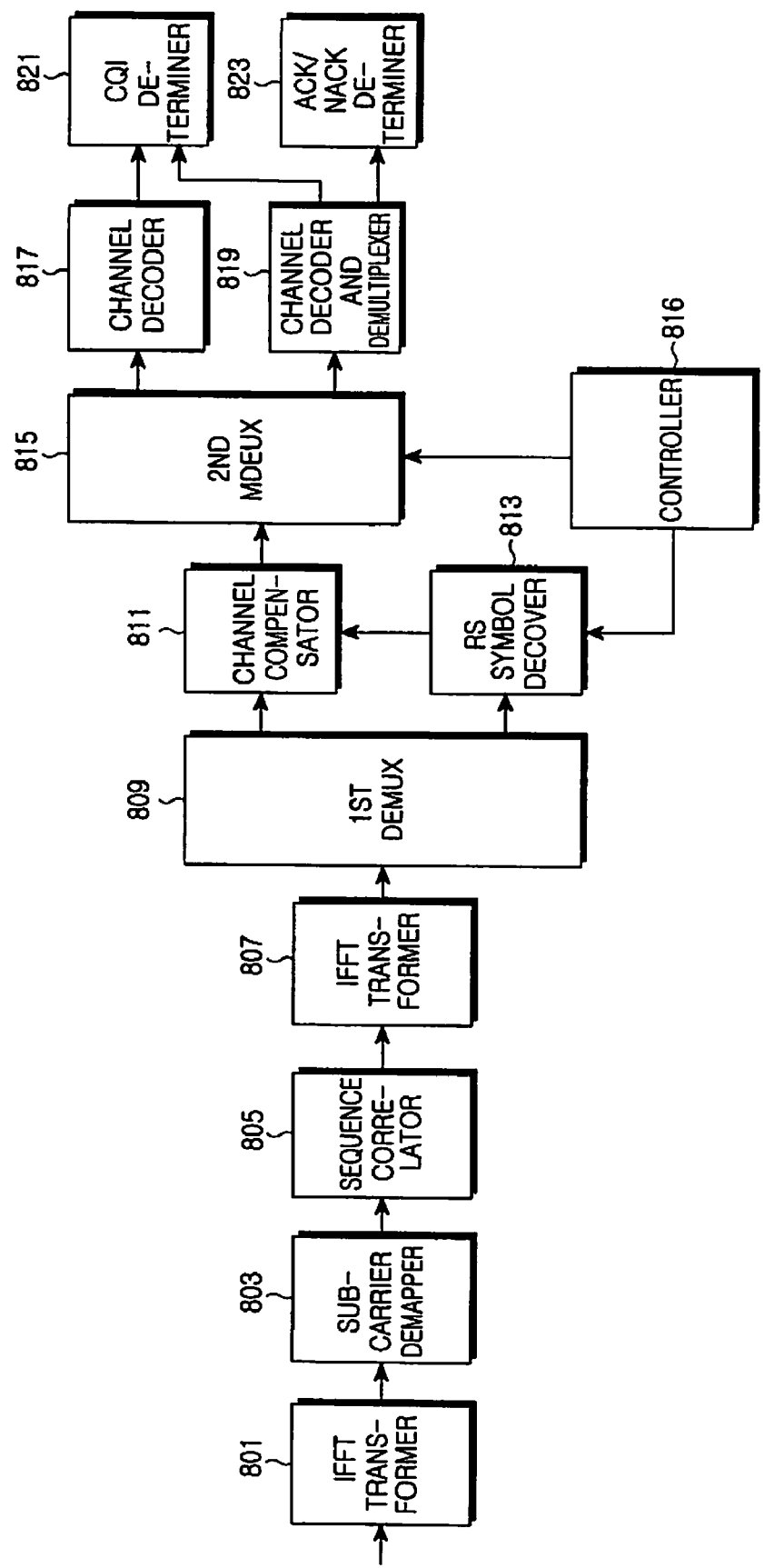
FIG. 8 is a diagram illustrating a structure of an ENB's reception apparatus according to an embodiment of the present invention.

FIG. 8 is a block diagram illustrating a structure of an ENB reception apparatus according to an embodiment of the present invention.

A signal received through an RF unit (not shown in FIG. 8) is converted into a frequency-domain signal by means of an FFT transformer 801. The converted frequency-domain signal is applied to a subcarrier demapper 803 by which a subcarrier signal corresponding to a PUCCH signal of the corresponding UE is selected therefrom. Thereafter, the selected subcarrier signal is applied to a ZC sequence correlator 805 where it undergoes correlation with the applied ZC sequence in the corresponding symbol interval, and then input to an IFFT transformer 807. The signal output from the IFFT transformer 807 is input to an RS symbol decover 813 by way of a first demultiplexer 809 when the current SC-FDMA symbol index corresponds to an RS symbol, and a value carried on the RS symbol is decovered in the RS symbol decover 813. Thereafter, a channel compensator 811 can obtain a channel estimate using the output of the RS symbol decover 813. Under the control of the controller 816, the decovering is performed with the RS symbol value corresponding to the case where only the CQI information is received, or the RS symbol value corresponding to the case where CQI and ACK/NACK are received together.

Based on the value output from the controller 816, the channel compensator 811 performs channel estimation and channel compensation. That is, the control channel symbols are input to a second demultiplexer 815 via the first demultiplexer 809 after undergoing channel compensation in the channel compensator 811. Then the second demultiplexer 815, under the control of the controller 816, provides its output to a channel decoder 817 when only the CQI information is received, and the input signal is decoded in the channel decoder 817. Based on the signal output from the channel decoder 817, a CQI determiner 821 makes a decision on CQI information. When a received SNR of the received CQI signal or RS signal is low, the decoded CQI information can be discarded in the CQI determiner 821.

When CQI and ACK/NACK symbol are received together, the CQI and ACK/NACK information undergo channel decoding and demultiplexing in a channel decoder and demultiplexer 819, and the results are input to the CQI determiner 821 and an ACK/NACK determiner 823, which make decisions on CQI information and ACK/NACK information, respectively. As described above, when received SNRs of the received CQI, ACK/NACK and RS signal are low, the decoded information can be discarded. In particular, application of the RS structure proposed by the present invention can remarkably reduce the SNR of the received RS signal when the ENB performs ACK/NACK reception due to the occurrence of an error that it misrecognizes that ACK/NACK and CQI information were transmitted together even though the UE transmitted only the CQI information. This contributes to a noticeable decrease in the probability that the ENB will misunderstand that ACK/NACK was transmitted.

Figure 9A:
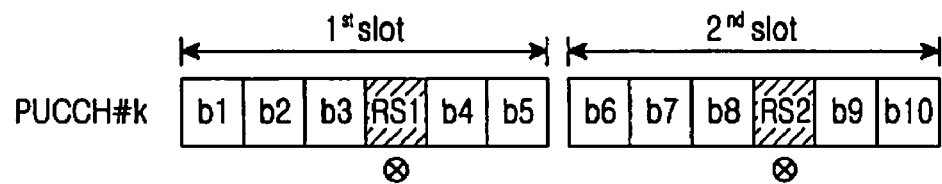
FIGS. 9A and 9B are diagrams illustrating an RS structure for transmission of uplink CQI transmission according to another embodiment of the present invention.
Figure 9B:
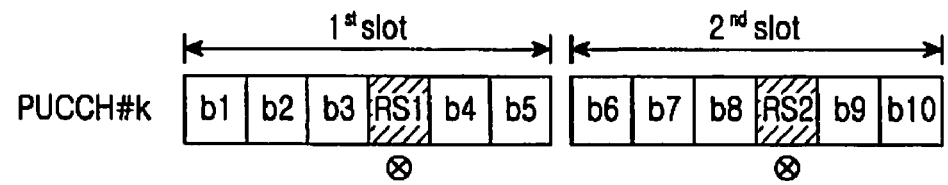

FIGS. 9A and 9B illustrate a subframe structure of an uplink control channel for CQI-only transmission or simultaneous transmission of CQI and ACK/NACK according to another embodiment of the present invention.

A difference between this embodiment and the embodiment shown in FIG. 4 is that as a long-length Cyclic Prefix (CP) is applied to an SC-FDMA symbol, 6 symbols exist in each slot, and one of the symbols is an RS symbol. The RS symbol is transmitted in a fourth symbol interval.

In the structure shown in FIG. 9A, the UE applies patterns of [+1] (901) and [+1] (902) to RS symbols in case 900 where it transmits only the CQI information over the uplink control channel. However, the UE applies patterns of [−1] (904) and [−1] (905) in case 903 where it transmits CQI and ACK/NACK information together over the uplink control channel. That is, for the cases 900 and 903, the UE applies RS symbol values having a 90° phase difference. Therefore, even though the UE transmitted control information and RS symbols with the format 900, when the ENB receives CQI and ACK/NACK information, misrecognizing that the format 903 was applied, the ENB estimates a channel from the RS symbol having a 180° phase error, thereby avoiding the false alarm that the ENB falsely detects the ACK/NACK information non-carried on the control channel transmitted by the UE. More specifically, when a codeword of the CQI channel transmitted by the UE is defined as X, normal decoding is almost impossible if the ENB performs channel estimation from the RS symbol values having the 180° phase difference before its demodulation, unless a codeword obtained by inverting 0 and 1 of each bit of the codeword X is generated when CQI and ACK/NACK are transmitted together.

As illustrated in FIG. 9B, although RS symbol patterns of [+1] (907) and [−1] (908) are applied in the first slot and the second slot, respectively, in case 906 where only the CQI is transmitted, and RS symbol patterns of [−1] (909) and [+1] (910) are applied in case 911 where CQI and ACK/NACK are transmitted together, the same 180° phase difference occurs between the RS symbols for the two cases. It is not necessary that the RS symbols should have the 180° phase difference, and the UE only needs to apply patterns so as to have a proper phase difference between the RS symbol patterns for the two cases according to the channel coding scheme applied to the control channels.

As illustrated in FIG. 1, in the EUTRA uplink, when symbols of the first slot and the second slot are transmitted in different frequency bands, they undergo channel estimation independently on a slot-by-slot basis. Therefore, applying orthogonal patterns over two slots by applying the RS symbol patterns of [+1 +1] and [−1 −1] over RS1 and RS2 for the cases 900 and 903, can hardly reduce the false alarm in the channel environment where the UE has a high mobility or stays in the urban areas. However, even such application of the RS symbol patterns is not excluded in the present invention, and this can reduce the false alarm in the channel environment where the UE has a low mobility and stays in the suburbs.

Figure 10A:
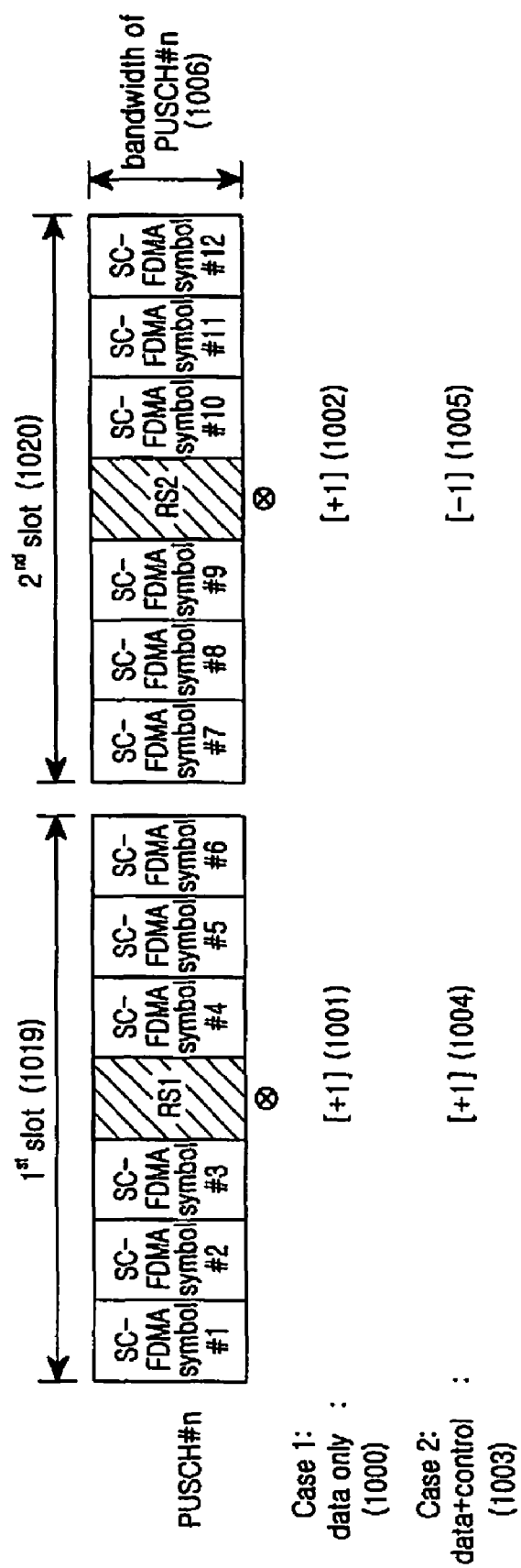
FIGS. 10A and 10B are diagrams illustrating an RS structure for transmission of uplink data channel transmission according to an additional embodiment of the present invention.
Figure 10B:
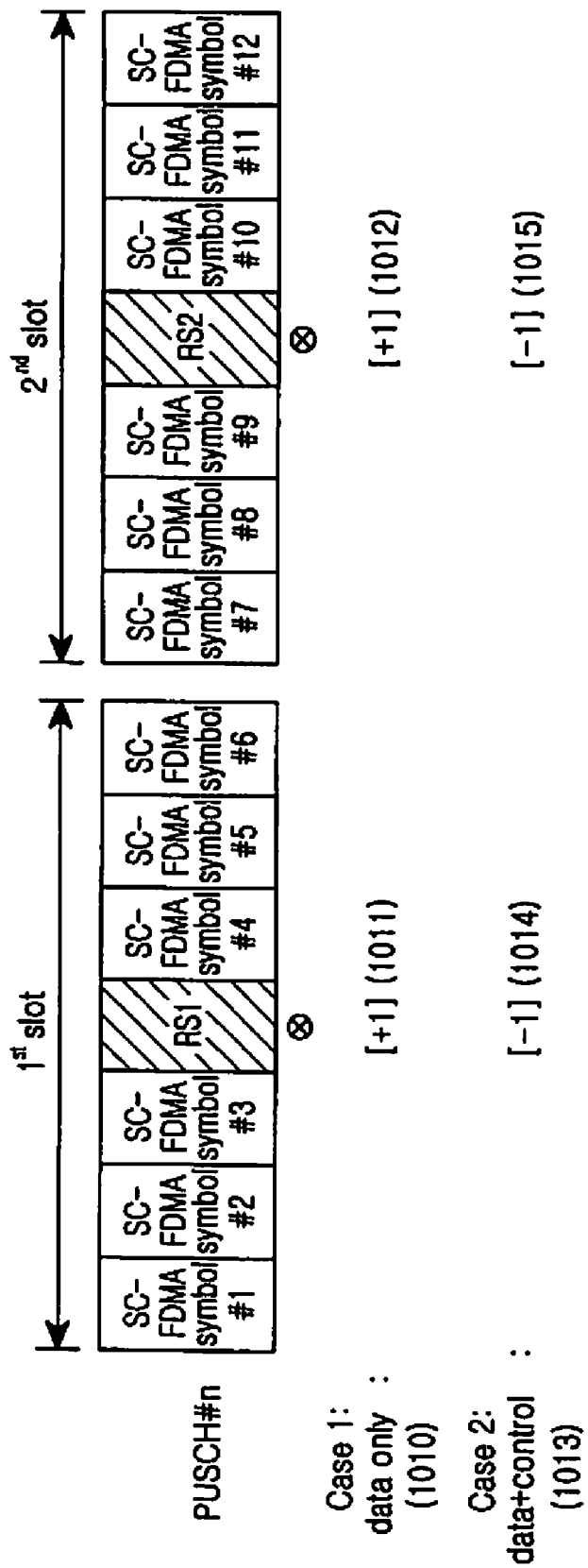

FIGS. 10A and 10B are diagrams illustrating an RS structure for transmission of an uplink data channel according to an additional embodiment of the present invention. In this embodiment RS symbol patterns having an orthogonal relation over two slots are applied to the uplink data channels.

In the EUTRA uplink, in order to satisfy the single-carrier transmission characteristic of SC-FDMA, when one UE should simultaneously transmit a data channel and a control channel in one subframe, the control channel symbols are transmitted in a transmission band of the data channel. In FIGS. 10A and 10B, the horizontal axis represents the time domain, and the vertical axis 1006 represents a bandwidth of an arbitrary uplink data channel Physical Uplink Shared Channel (PUSCH) #n.

FIGS. 10A and 10B illustrate an embodiment in which different RS symbol patterns are applied for cases 1000 and 1010 where only data is transmitted in the PUSCH #n, and cases 1003 and 1013 where data is transmitted together with control information. RS is transmitted on the center symbol among 7 symbols in the slot. In FIG. 10A, symbols of [+1] (1001) and [+1] (1002) are transmitted on RS1 and RS2, respectively, in the case 1000 where only data is transmitted in the PUSCH band 1006, and symbols of [+1] (1004) and

[−1] (1005) are transmitted on RS1 and RS2, respectively, in the case 1003 where data and control information are transmitted together. That is, if an RS symbol pattern [RS1 RS2] over the entire two slots is compared with the two cases, the resulting patterns become [+1 +1] and [+1 −1], respectively, maintaining the mutual orthogonal relation.

By applying different RS symbol patterns according to the possible cases, it is possible to reduce the false alarm as described for the PUCCH in the foregoing embodiments. Similar to the embodiment of FIG. 4, even though the ENB has scheduled a downlink data packet to a certain UE through a downlink control channel, since it has failed to normally receive the control channel, the UE may transmit no ACK/NACK in the subframe where it will transmit ACK/NACK for the data packet. However, if the UE is scheduled an uplink data packet in the subframe, the UE transmits only the data channel without the ACK/NACK information in the subframe.

When, even though the UE transmitted a data channel without control information by applying RS symbol patterns 1001 and 1002, the ENB misrecognizes that the UE transmitted the data channel together with control information, the ENB receiver performs channel compensation by estimating a channel different from the actual channel by applying RS symbol patterns 1004 and 1005, thus failing in demodulation of the data channel. In this case, the ENB can perceive that the UE transmitted only the data channel, if the ENB has succeeded in performing decoding on the received data channel after its channel estimation and channel compensation by applying the RS symbol patterns 1001 and 1002. An alternative method can compare an SNR of a channel estimate obtained from an RS symbol pattern considered for the case 1000 with an SNR of a channel estimate obtained from an RS symbol pattern considered for the case 1003 to check which case is higher in the SNR of the channel estimate, thereby determining whether the UE applied the transmission format for the case 1000 or the transmission format for the case 1003.

Similarly to the second embodiment, the example of FIG. 10B applies RS symbol patterns having a 180° phase difference between the cases 1010 and 1013. Symbols of [+1] (1011) and [+1] (1012) are transmitted on RS1 and RS2 in the case where 1010 the UE transmits only the data packet over the PUSCH, and symbols of [−1] (1014) and [−1] (1015) are transmitted in the case 1013 where data and control information are transmitted together. The RS symbol structure of FIG. 10A is suitable for the case where the PUSCH is transmitted in the same frequency band both in the first slot and the second slot, and the RS symbol structure of FIG. 10B is suitable for the case where the PUSCH, like the PUCCH, changes in its transmission band between the first slot and the second slot, i.e., undergoes frequency-hopping transmission.

As is apparent from the foregoing description, when the UE transmits an uplink control channel in the wireless communication system, the embodiments of the present invention can remarkably reduce the error probability that even though the UE transmitted no ACK/NACK information, the ENB will falsely detect the ACK/NACK information, thereby preventing the problem that the downlink data packet that the UE has failed to receive is discarded in the ENB.

In addition, according to the embodiments of the present invention, the ENB can correctly detect even the CQI information transmitted by the UE, thereby contributing to an increase in the downlink system capacity.

While the invention has been shown and described with reference to a certain preferred embodiments thereof, it will be understood by those skilled in the art that various changes in form and details may be made therein without departing from the spirit and scope of the invention as defined by the appended claims.

What is claimed is:

1. A method for transmitting a first type of information bits using a signal in a communication system, the signal comprising one or more slots, a slot comprising a first number and a second number of symbols, wherein a reference signal is transmitted in the first number of symbols and a second type of information bits is transmitted in the second number of symbols, the method comprising the steps of:

modulating the first number of symbols by a first orthogonal cover if the first number of symbols has a first value;

modulating the first number of symbols by a second orthogonal cover if the first number of symbols has a second value; and transmitting the modulated first number of symbols, wherein the second value includes an indication that two types of uplink control information are transmitted.

2. The method as in claim 1, wherein the first type of information bits comprises acknowledgement bits corresponding to correct or incorrect reception of data.

3. The method as in claim 1, wherein the second type of information bits comprises channel quality indication (CQI) bits.

4. The method as in claim 1, wherein the first value comprises an indication that channel quality indication (CQI) bits are transmitted.

5. The method as in claim 1, wherein the second value comprises an indication that channel quality indication (CQI) bits and acknowledgement bits are transmitted.

6. The method as in claim 1, wherein, when the first number of symbols is two, the first orthogonal cover is {1, 1}, and the second orthogonal cover is {1, −1}.

7. The method as in claim 1, wherein the communication system comprises a single-carrier frequency domain multiple access communication system.

8. The method as in claim 1, wherein the first value includes an indication that one type of uplink control information is transmitted.

9. An apparatus for transmitting a first type of information bits using a signal in a communication system, the signal comprising one or more slots, a slot comprising a first number and a second number of symbols, wherein a reference signal is transmitted in the first number of symbols and a second type of information bits is transmitted in the second number of symbols, the apparatus comprising:

a multiplier unit for modulating the first number of symbols by a first orthogonal cover if the first number of symbols has a first value, and modulating the first number of symbols by a second orthogonal cover if the first number of symbols has a second value; and a transmitter unit coupled to the multiplier unit for transmitting the modulated first number of symbols, wherein the second value comprises an indication that two types of uplink control information are transmitted.

10. The apparatus as in claim 9, wherein the first type of information bits comprises acknowledgement bits corresponding to correct or incorrect reception of data.

11. The apparatus as in claim 9, wherein the second type of information bits comprises channel quality indication (CQI) bits.

12. The apparatus as in claim 9, wherein the first value comprises an indication that channel quality indication (CQI) bits are transmitted.

13. The apparatus as in claim 9, wherein the second value comprises an indication that channel quality indication (CQI) bits and acknowledgement bits are transmitted.

14. The apparatus as in claim 9, wherein, when the first number of symbols is two, the first orthogonal cover is {1, 1}, and the second orthogonal cover is {1, −1}.

15. The apparatus as in claim 9, wherein the communication system comprises a single-carrier frequency domain multiple access communication system.

16. The apparatus as in claim 9, wherein the first value comprises an indication that one type of uplink control information is transmitted.

\* \* \* \* \*